M. PORTER & C. E. & G. F. JENKINS.

Wheel-Cultivator.

No. 57,562

Patented Aug. 28, 1866.

Witnesses:

Inventors:
M Porter
C. E. & G. F. Jenkins

UNITED STATES PATENT OFFICE.

MICHAEL PORTER, C. E. JENKINS, AND G. F. JENKINS, OF TERRE HAUTE, ILLINOIS.

IMPROVEMENT IN CULTIVATORS.

Specification forming part of Letters Patent No. 57,562, dated August 28, 1866.

*To all whom it may concern:*

Be it known that we, MICHAEL PORTER, C. E. JENKINS, and G. F. JENKINS, of Terre Haute, in the county of Henderson and State of Illinois, have invented a new and Improved Cultivator; and we do hereby declare that the following is a full, clear, and exact description thereof, which will enable others skilled in the art to make and use the same, reference being had to the accompanying drawings, forming part of this specification, in which—

Figure 1:
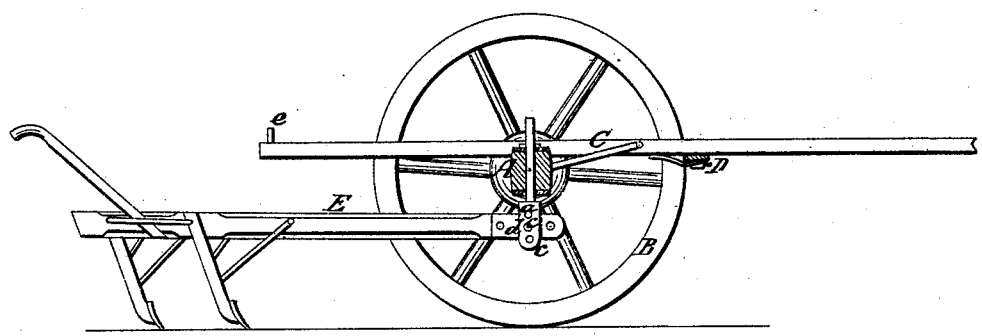
Figure 2:
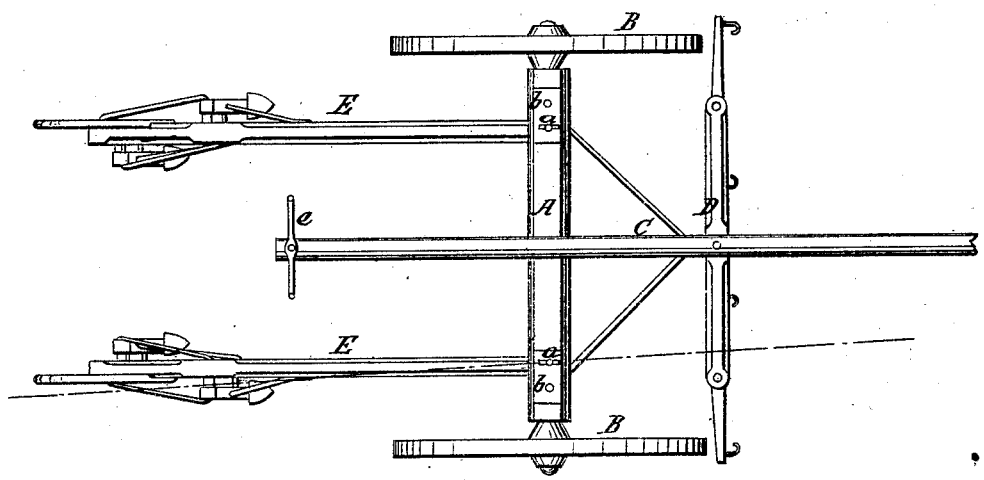

Figure 1 represents a longitudinal vertical section of this invention. Fig. 2 is a plan or top view of the same.

Similar letters of reference indicate like parts.

This invention relates to certain improvements in that class of cultivators which straddle a row, and which are provided with a raised draft-pole that passes over the growing plants.

The nature of the invention and its peculiar advantages will be apparent from the following description.

A represents the axle, which has its bearings in two wheels, B B', of large diameter, so that said axle is sufficiently elevated to pass over the growing plants. Secured to the middle of this axle is the draft-pole C, and the double-tree D is attached to the under side of this draft-pole, as clearly shown in the drawings.

E E are two plow-beams, which are fastened to the axle by means of swivel-brackets $a$, the shanks of which have their bearings in holes $b$ in the axle, and by having two or more such holes on each side the distance of the beams from each other can be adjusted to suit furrows of different widths. The forked ends of the brackets $a$ are also provided with several holes $c$ to receive the pin $d$, which serves to fasten the beam and bracket together, and by raising or lowering this pin the inclination of the beam is changed, and the cultivator can be adjusted for different soil, or to cut deeper or shallower, as may be desirable.

The draft-pole C extends beyond the rear edge of the axle, and it is provided with a cross-bar, $e$, which may be used to support the plow-beams and hold the plowshares suspended above the ground if the cultivator is to be transferred from one place to another.

This cultivator is very simple in its construction, it is easily operated, and is not liable to get out of order.

What we claim as new, and desire to secure by Letters Patent, is—

The combination of the adjustable swivel-brackets $a$, plow-beams E E, and axle A, arranged and operating in the manner as and for the purpose herein specified.

MICHAEL PORTER.
   C. E. JENKINS.
   G. F. JENKINS.

Witnesses:
 JOSEPH ALLEN,
 CURTIS BEAL.